(12) United States Patent
Legrand

(10) Patent No.: US 6,874,235 B1
(45) Date of Patent: Apr. 5, 2005

(54) NOISE REDUCING CUTTING WIRE FOR BUSH CUTTER AND HEDGE-TRIMMER

(75) Inventor: Emmanuel Legrand, Villeneuve (FR)

(73) Assignee: Speed France, Arnas (FR)

( * ) Notice: Subject to any disclaimer, the term of this patent is extended or adjusted under 35 U.S.C. 154(b) by 0 days.

(21) Appl. No.: 09/979,051

(22) PCT Filed: May 17, 2000

(86) PCT No.: PCT/FR00/01332

§ 371 (c)(1),
(2), (4) Date: Jan. 24, 2002

(87) PCT Pub. No.: WO00/70929

PCT Pub. Date: Nov. 30, 2000

(30) Foreign Application Priority Data

May 20, 1999 (FR) .......................................... 99 06598

(51) Int. Cl.[7] ............................................. A01D 34/416
(52) U.S. Cl. ....................................................... 30/276
(58) Field of Search .................... 30/276, 347; 56/12.7, 56/295; 428/401, 400, 398, 397

(56) References Cited

U.S. PATENT DOCUMENTS 4,054,993 A * 10/1977 Kamp et al. .................. 30/276
4,290,257 A    9/1981 Frantello
5,220,774 A * 6/1993 Harbeke et al. .......... 30/276 X

FOREIGN PATENT DOCUMENTS

DE    196 32 721 A1    2/1998
WO    WO 97/19584       6/1997

* cited by examiner

*Primary Examiner*—Douglas D Watts
(74) *Attorney, Agent, or Firm*—Oliff & Berridge, PLC

(57) ABSTRACT

The invention concerns a cutting wire for trimming and cutting plants useful in appliances with rotary heads, such as bush cutters and hedge trimmers. It has formed shapes of larger cross-section, such as annular shapes, in succession at intervals in the longitudinal direction of the wires, the shapes being separated from one another by intermediate longitudinal sections of the wire, with smaller cross-sections. Such a cutting wire provides operating noise reduction, in particular elimination of squeal and other high pitched sounds.

14 Claims, 2 Drawing Sheets

NOISE REDUCING CUTTING WIRE FOR BUSH CUTTER AND HEDGE-TRIMMER

The present invention relates to cutting wires teat are intended to trim and cut vegetation and can be used on motorized rotary-head cultivating equipment referred to jointly as brushcutters and edge cutters.

This equipment is generally fitted wit a heat engine or an electric motor that drives in rotation at a high speed, which may be between about 3000 rpm and 12,000 rpm, a revolving head supporting one or more cutting wires. During the rotation of the head and owing to the effect of the centrifugal force, the cutting wire or wires spread out radially and thus sweep a certain circular zone, within which they have a cutting effect on the vegetation encountered.

The cutting wires most frequently made and sold and intended for such a use are smooth monofilaments, generally of a single material, in particular made from synthetic material, e.g. polyamide. These wires can have either a round cross section or a polygonal cross section, e.g. a square or star-shaped cross section.

During use, such cutting wires generate significant and unpleasant noise, which is added to the noise of the motor for driving the rotary bead. This noise entails noise pollution, which is all the more harmful because, by their very nature, brushcutters and edge trimmers are used in an outdoor environment. Moreover, regulations designed to limit the noise of this equipment to a level deemed acceptable are being prepared.

Various solutions aimed at reducing the noise generated by cutting wires during use have already been proposed.

Thus, certain known cutting wires have longitudinal grooves, which are straight or helicoidal with a rounded or angular cross section and are variable in number (one or more longitudinal grooves); these grooves can be replaced by straight or helicoidal ribs. Reference may be made to German patent No. 4005879 in this context. This solution has the disadvantage of impairing the surface finish of the wire, which is an important parameter as regards its cutting performance.

Another known solution, which is applicable in particular to a cutting wire of square cross section, consists in twisting the wire. This solution, which is disclosed by German utility model No. 9412925, is relatively effective but the reduction in noise still depends on the number of helical turns of the cutting wire per unit length of this wire. Moreover, the torsion of the wire impairs its surface finish; it also makes the production of this wire more complicated and more expensive.

French patent application No. 2741776 in the name of the applicant (see also the equivalent WO 9719584) proposes an undulating cutting wire intended to reduce operating noise. In its basic embodiment, this wire has a constant, in particular circular, cross section, over its entire length, and it has undulations in a single radial direction that are repeated in its longitudinal direction, the undulating cutting wire thus spreading out in a single plane. This solution makes it possible to achieve a global reduction in noise but it does not eliminate certain whistling noises or other unpleasant high-pitched sounds generated by the cutting wire during use.

For the purpose of reducing operating noise, another French patent application No. 2760596 in the name of the applicant provides a cutting wire formed by a core of the monofilament type coated with a granular covering that gives the surface of the wire an irregular and/or rough appearance. This is a composite cutting wire, i.e. a type of wire remote from the wires made of a single material to which the present invention relates.

Cutting wires with a special profile, in the form of a water droplet or an airplane wing, have also been proposed, such a profile being supposed to improve penetration of the air. This solution allows only a fairly small reduction in the noise and is therefore not particularly effective.

Finally, attempts to achieve cutting wires that have small cells on their surface in the manner of a golf ball may be cited, see, for example, German patent application No 196 32 721 (FIG. 5). Apart from the difficulties involved in its manufacture, this last solution leads to an impairment of the surface finish of the wire.

The present invention aims to eliminate all the disadvantages explained above by providing an improved cutting wire that gives a significant reduction in noise pollution and, in particular, eliminates all the whistling noises and undesirable high-pitched sounds.

To this end, the invention relates to a silent cutting wire for brushcutters and edge trimmers, which is characterized essentially in that it has shaped features of larger cross section following on from one another at intervals in the longitudinal direction of this cutting wire, said shaped features being separated from one another by intermediate longitudinal sections of the wire that are of smaller cross section.

The invention thus provides a wire with a "ringed" or similar appearance, i.e. with a cross section that is not constant but, on the contrary, is variable over its length, the wire typically having annular collars, which are separated from one another by narrower portions of wire and are repeated indefinitely in accordance with a certain "pitch". It has surprisingly been found and then verified by tests that a cutting wire shaped in this way ensures a large global reduction in the noise level generated by the rotation of the wire in air; moreover, the frequency spectrum of the residual noise is such that the whistling noises or the most unpleasant high-pitched sounds are eliminated.

Various embodiments of the cutting wire that forms the subject matter of the invention can be envisaged, depending on the shape and size of the abovementioned shaped features, the pitch between these shaped features, the cross-sectional shape of the cutting wire, etc. In particular, the geometry of this wire can be characterized by the ratio between the (maximum) cross section of said shaped features, on the one hand, and the (minimum) cross section of the sections of wire situated between these shaped features, on the other hand. The thickness of the abovementioned shaped features constitutes another parameter that determines the geometry of the cutting wire and the effect obtained, it being possible for this thickness to be very small in the case of shaped features reduced virtually to a circular or elliptical ridge or greater in the case of shaped features in the form of more or less wide annular beads.

The invention will at all events be better understood with the aid of the description which follows with reference to the attached schematic drawing, which shows, by way of example, a number of embodiments of this silent cutting wire for brushcutters and edge trimmers:

Figure 1:
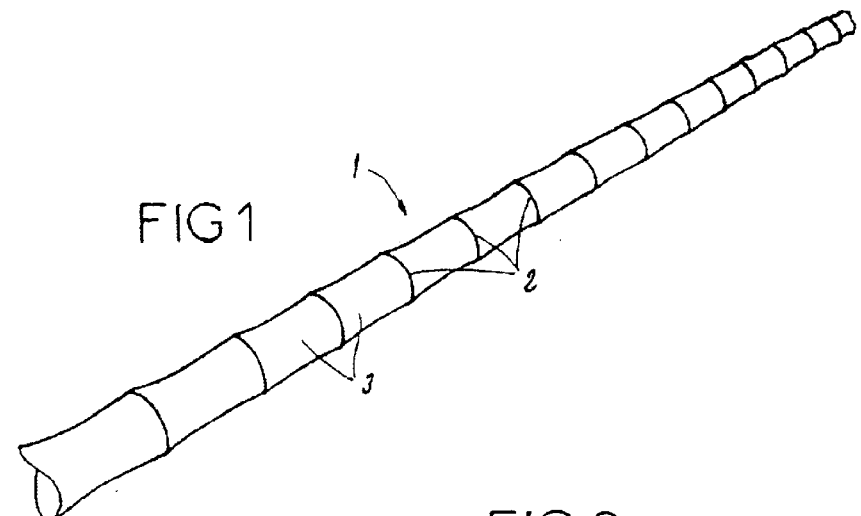
FIG. 1 is a perspective view of a cutting wire in accordance with the present invention.

FIG. 1 shows in a general way a cutting wire 1 for brushcutters or edge trimmers, which is a wire of round but non-constant cross section. Along its entire length, this wire 1 has annular shaped features 2 of larger cross section, between which intermediate wire portions 3 of smaller cross section extend.

Figure 2:
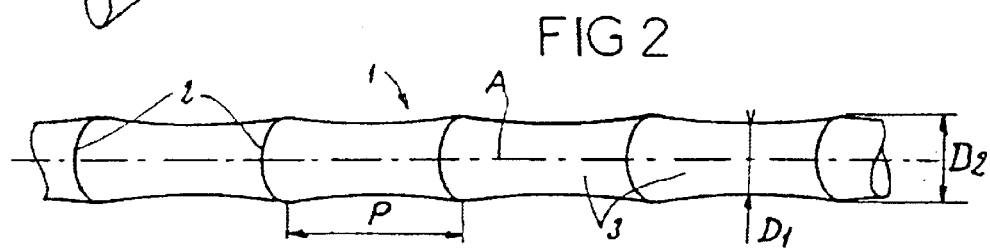
FIG. 2 is a perspective view on an enlarged scale of a section of the cutting wire in FIG. 1.
Figure 3:
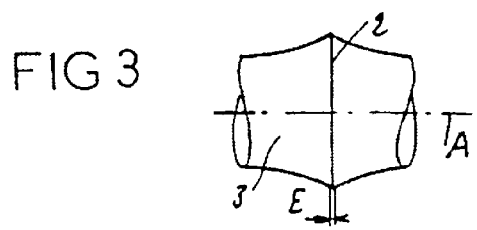
FIG. 3 shows a detail of the cutting wire in FIGS. 1 and 2 on an enlarged scale.

As FIGS. 2 and 3 show more particularly, the annular shaped features 2 are here each formed by a circular ridge of very small thickness B centered on the longitudinal axis A of the wire 1. These annular shaped features 2 are separated from one another in the longitudinal direction of the wire 1 by a constant pitch P. The narrower portions 3 of the wire 1, which extend between the annular shaped features 2, have a minimum diameter denoted by D1, while the maximum outside diameter of the annular shaped features 2 is denoted by D2.

The ratio D2/D1 of the diameters defined above characterizes the geometry of the cutting wire 1. For example, the minimum diameter D1 of the narrower portions 3 of the cutting wire 1 is equal to about 1.2 mm, while the outside diameter of the annular shaped features 2 is equal to about 31.5 mm, corresponding to a ratio D2/D1 of about 1.25.

Figure 4:
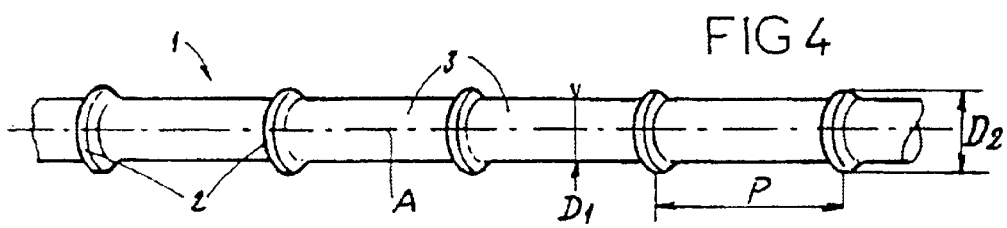
FIG. 4 is a view similar to FIG. 2 showing another embodiment of the cutting wire that is the subject matter of the invention.
Figure 5:
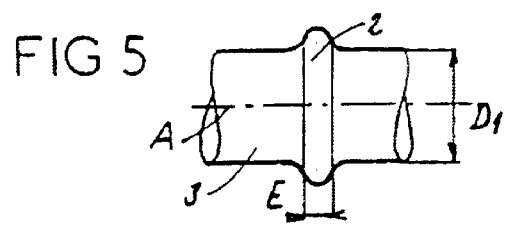
FIG. 5 shows a detail of the cutting wire in FIG. 4 on an enlarged scale.

FIGS. 4 and 5 show another cutting wire 1, which forms a variant of the previous wire. This wire 1, which again has a circular cross section, has shaped features 2 in the form of annular beads with a greater thickness E and a rounded profile, the maximum outside diameter of which is indicated at D2 and which are separated from one another by a pitch P. The narrower portions 3 of the cutting wire 1, which extend between the annular shaped features 2, here have a constant diameter D1 over their entire length, the diameter D1 being, of course, less than the diameter D2.

Figure 6:
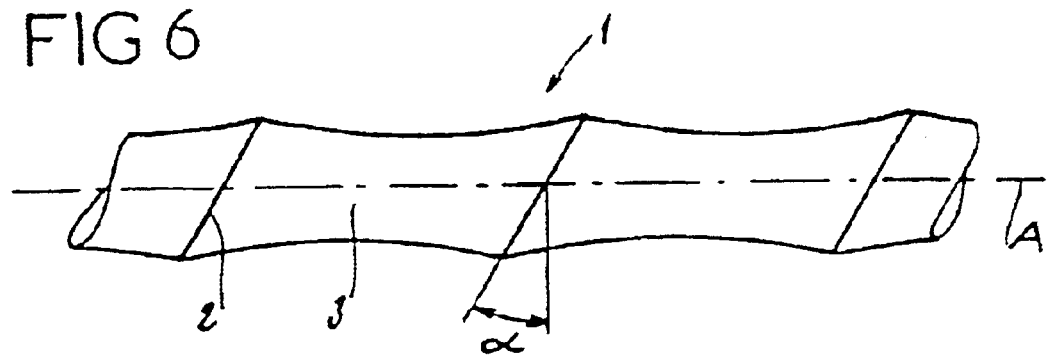
FIGS. 6 and 7 illustrate variants of the cutting wires in the preceding figures.
Figure 7:
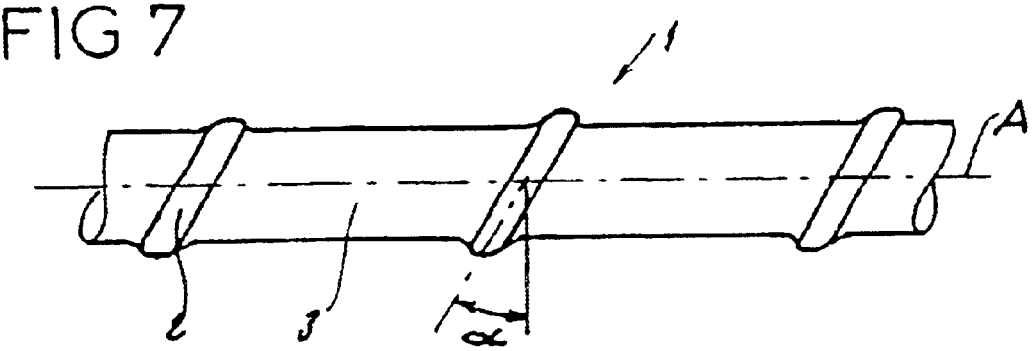

In the examples illustrated by FIGS. 1 to 5, the shaped features 2 are situated in planes perpendicular to the longitudinal axis A of the cutting wire 1. FIGS. 6 and 7 illustrate variants of this wire 1 in which, in contrast, the shaped features 2 are situated in planes that are not perpendicular to the longitudinal axis A of the wire 1, that is to say in planes with a slope a with respect to a plane perpendicular to the axis A.

More particularly, the shaped features 2 in the embodiment shown in FIG. 6 are formed by sloping elliptical ridges. In the embodiment shown in FIG. 7, the shaped features 2 are formed by sloping beads.

In all cases, the cutting wire 1 with annular shaped features 2 as described above operates silently and without whistling or any other unpleasant high-pitched sounds.

It would not be a departure from the scope of the invention as defined in the attached claims to modify the specific shape of the annular shaped is features 2 or the various geometric parameters P, E, D1, D2 (or their ratios) that characterize the shape of the cutting wire 1 or indeed to modify the shape of the cross section of this cutting wire, it being possible for this cross section to be polygonal, e.g. square, rather than round and even for certain variants to have shaped features 2 with cross sections different in shape from that of the other portions 3 of the same wire 1.

What is claimed is:

1. A silent cutting wire for rotary-head bush cutters and edge trimmers, comprising circular or elliptical ridges of very small thickness spaced at intervals in the longitudinal direction of the cutting wire, the ridges being separated from one another by longitudinal sections of the cutting wire having a smaller cross-section, the cross-section between two adjacent ridges changing continuously from a large cross-section to a small intermediate cross-section and the thence to a large cross-section.

2. The silent cutting wire as claimed in claim 1, wherein the ridges are reduced to a circular or elliptical ridge.

3. The silent cutting wire as claimed in claim 1, wherein the ridges are in the form of annular beads.

4. The silent cutting wire as claimed in claim 1, wherein the ridges are situated in planes that are not perpendicular to the longitudinal axis of the silent cutting wire.

5. The silent cutting wire as claimed in claim 1, wherein the ridges are situated in planes that are not perpendicular to the longitudinal axis of the silent cutting wire and have a slope.

6. The silent cutting wire as claimed in claim 1, wherein a ratio between the maximum outside diameter of the ridges and the diameter of the small intermediate cross-sections of the silent cutting wire is about 1.25.

7. The silent cutting wire as claimed in claim 2, wherein the ridges are situated in planes that are not perpendicular to the longitudinal axis of the silent cutting wire.

8. A cutting wire for rotary-head brushcutters and edge trimmers that operate silently, characterized in that the cutting wire is a wire made from a single material that has shaped features of larger cross-section following on from one another at regular intervals, according to a pitch, in the longitudinal direction of the cutting wire, the shaped features being separated from one another by intermediate longitudinal sections of the wire that are of smaller cross-section, the shaped features are in the form of annular beads and are situated in planes that are not perpendicular to the longitudinal axis of the wire.

9. A cutting wire for rotary-head brushcutters and edge trimmers that operate silently, characterized in that the cutting wire is a wire made from a single material that has shaped features of larger cross-section following on from one another at regular intervals, according to a pitch, in the longitudinal direction of the cutting wire, the shaped features being separated from one another by intermediate longitudinal sections of the wire that are of smaller cross-section, the shaped features are reduced to a circular or elliptical ridge of very small thickness and are situated in planes that are not perpendicular to the longitudinal axis of the wire and have a slope.

10. A cutting wire for rotary-head brushcutters and edge trimmers that operate silently, characterized in that the cutting wire is a wire made from a single material that has shaped features of larger cross-section following on from one another at regular intervals, according to a pitch, in the longitudinal direction of the cutting wire, the shaped features being separated from one another by intermediate longitudinal sections of the wire that are of smaller cross-section, the shaped features are in the form of annular beads and are situated in planes that are not perpendicular to the longitudinal axis of the wire and have a slope.

11. The silent cutting wire as claimed in claim 2, wherein a ratio between the maximum outside diameter of the ridges and the diameter of the small intermediate cross-sections of the silent cutting wire is about 1.25.

12. The silent cutting wire as claimed in claim 3, wherein a ratio between the maximum outside diameters of the ridges and the diameter of the small intermediate cross-sections of the silent cutting wire is about 1.25.

13. The silent cutting wire as claimed in claim 4, wherein a ratio between the maximum outside diameter of the ridges and the diameter of the small intermediate cross-sections of the silent cutting wire is about 1.25.

14. The silent cutting wire as claimed in claim 5, wherein a ratio between the maximum outside diameter of the ridges and the diameter of the small intermediate cross-sections of the silent cutting wire is about 1.25.

* * * * *